June 12, 1951  L. SISSON  2,556,378
ROTARY PUMP AND MOTOR HYDRAULIC TRANSMISSION
Filed March 8, 1949  3 Sheets-Sheet 1

INVENTOR.
LOWELL SISSON,
BY
McMorrow, Berman & Davidson
ATTORNEYS.

June 12, 1951  L. SISSON  2,556,378
ROTARY PUMP AND MOTOR HYDRAULIC TRANSMISSION
Filed March 8, 1949  3 Sheets-Sheet 2

FIG. 2.
FORWARD

FIG. 3.
REVERSE

FIG. 4.
PARK

INVENTOR.
LOWELL SISSON,
BY
McMorrow, Berman & Davidson
ATTORNEYS.

June 12, 1951 — L. SISSON — 2,556,378
ROTARY PUMP AND MOTOR HYDRAULIC TRANSMISSION
Filed March 8, 1949 — 3 Sheets-Sheet 3

INVENTOR.
LOWELL SISSON,
BY
McMorrow, Berman & Davidson
ATTORNEYS.

Patented June 12, 1951

2,556,378

UNITED STATES PATENT OFFICE 2,556,378

ROTARY PUMP AND MOTOR HYDRAULIC TRANSMISSION

Lowell Sisson, Hampton, Va.

Application March 8, 1949, Serial No. 80,307

7 Claims. (Cl. 60—19)

This invention relates to hydraulic transmissions, and more particularly to an automatic control for an automotive vehicle transmission.

It is among the objects of the invention to provide a hydraulic transmission for an automotive vehicle which transmission is equipped with manually-operated and manually-adjustable automatic controls whereby the transmission may be placed in an idling condition, so that the vehicle may be stopped with the engine operating and the engine may be started and operated without driving the vehicle, and may be drivingly connected to the vehicle driving wheels when desired, whereby the direction of movement of the vehicle may be reversed, when desired, whereby the speed ratio between the driving and driven components is automatically increased toward direct drive or over-drive in response to increasing vehicle speed within a predetermined speed range, the speed ratio from the driving to the driven components of the transmission being sufficiently low at all times to hold the engine power below a value which would cause slippage of the vehicle driving wheels, whereby the speed ratio between the driving and driven components of the engine is automatically adjusted to maintain the maximum car speed in proportion to engine speed under the instant driving conditions of grade, surface, wind, et cetera, to provide maximum operational economy of the vehicle engine, and the speed ratio is automatically reduced away from a 1-to-1 ratio when the engine throttle is suddenly opened to accelerate the vehicle, whereby power surges of the driving component of the transmission are cushioned and smoothed out as they are applied to the driven component, enabling the driven component to deliver a smooth flow of power at all times, whereby the same vehicle speed may be obtained under various conditions at different engine speeds, whereby the drive between the driving and driven components of the transmission is reversible, so that the engine serves as a brake for the vehicle when decelerating, and whereby the speed ratio between the driving and driven components of the transmission is automatically reduced upon deceleration of the vehicle below a predetermined speed to place the transmission in condition to accelerate the vehicle when engine power is again applied to the transmission driving component.

Other objects and advantages will become apparent from a consideration of the following description and the appended claims in conjunction with the accompanying drawings, wherein:

With continued reference to the drawings, the transmission comprises, in general, a positive displacement pump 10 of any suitable type having a pump shaft 11 drivingly connected to a power plant, such as an internal combustion engine of the character commonly employed for the propulsion of automotive vehicles, a fluid motor 12 having a motor shaft 13 connected through suitable gearing, including a differential mechanism, to the driving wheels of the vehicle, the vehicle, the engine and the differential mechanism being omitted from the drawings in order to simplify the illustration. The pump 10 has an outlet 14, and an inlet 15 connected by respective tubular conduits 16 and 17 to corresponding fluid channels 18 and 19 in a valve body 20. The valve body 20 includes a cylindrical valve chamber 21 and provides a bearing 22 for the end of the pump shaft 11 extending from the end of the pump opposite the end adjacent the spline connection 23 by means of which the pump is drivingly connected to the vehicle engine.

From the valve chamber 21 parallel fluid conduits 24 and 25 extend to a second valve housing including a cylindrical valve chamber or receptacle 26, and from the valve receptacle 26 respective fluid conduits 27 and 28 extend to the outlet 29 and inlet 30 of the fluid motor 12 for forward drive.

A brace 31 extends between the conduits 27 and 28 and provides a bearing 32 for the end of the motor shaft 13 opposite the end provided with splines 33 for connection to the vehicle differential mechanism. Respective branch conduits 34 and 35 extend laterally from the conduits 27 and 28, and are connected at their outer ends to respective surge tanks 36 and 37, each of which is adapted to contain a quantity of hydraulic fluid and a quantity of air or other suitable compressible gas, and to act as a cushion to smooth out power impulses delivered from the pump 10 to the fluid motor 12, the surge tank 37 being operative when the vehicle is being driven in a forward direction, and the tank 36 being operative when the vehicle is being driven in a reverse direction.

A third branch conduit 38 leads from the conduit 34 to the valve receptacle 26 at the side of the conduit 28 opposite the conduit 27, so that the valve receptacle has five conduit connections thereto. A cylindrical valve plug 39 is rotatably mounted in the cylindrical receptacle 26 and has two substantially parallel, curved passages 40 and 41 extending transversely therethrough.

Figures 1, 14, 15:
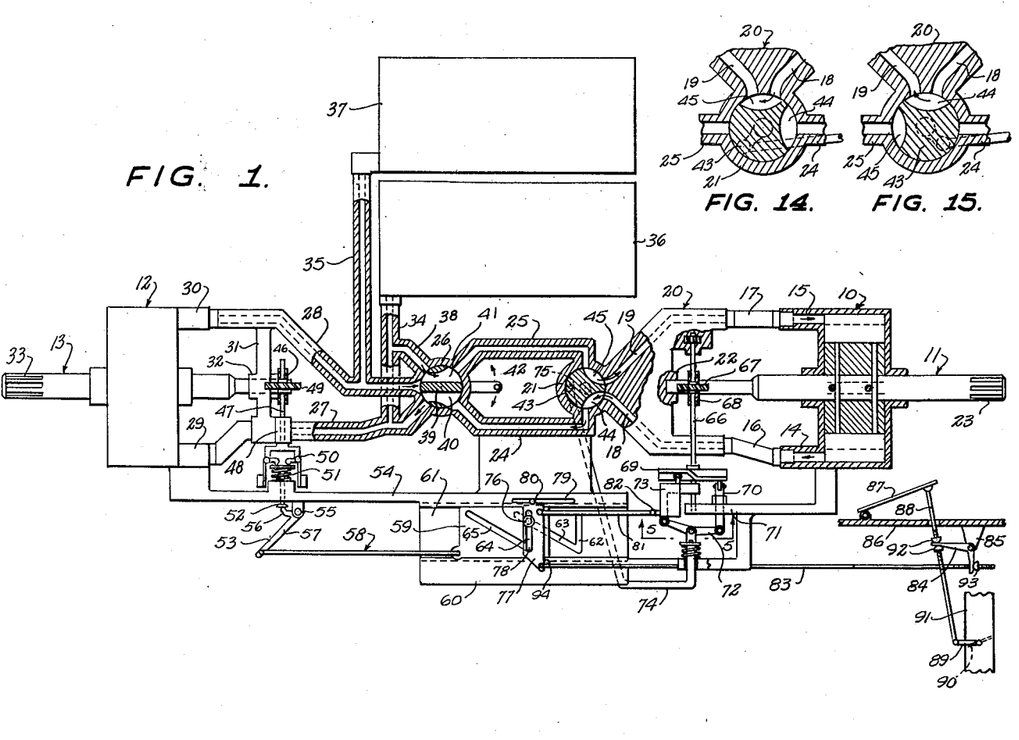
Figure 1 is a diagrammatic plan view of a hydraulic transmission and control system, illustrative of the invention, certain portions of the transmission being broken away and shown in cross-section to better illustrate the construction thereof.
Figure 14 is a transverse cross-section of a pump-control valve illustrated in Figure 1, and constituting an operative component of the control mechanism, showing the valve in a different operative position from that illustrated in Figure 1.
Figure 15 is a view similar to Figure 14 showing the control valve in a position different from that illustrated in Figures 1 and 14.

The valve plug 39 is manually rotated by suitable means including the lever 42 connected at one end to the valve plug, and at its opposite end to a suitable manually-operated control, and when the valve plug is in its operative position illustrated in Figure 1, conduit 28 is connected through both passages 40 and 41, to conduits 38, 34 and 27, the fluid motor being thus by-passed and free to rotate. The conduit 24 is connected to the fluid motor through conduit 27 and the conduit 25 is connected to the branch conduit 38 through the passage 41, the conduit 27 being connected to the branch conduit 38 through the branch conduit 34, so that fluid from the pump outlet 14 passing through the conduit 24 may by-pass through the conduits 27, 34 and 38 and back through the conduit 25 to the pump inlet 15, the pump being thus also by-passed and delivering no power to the fluid motor 12.

This is the position of the direction control valve for towing, coasting or pulling of the vehicle.

Figure 2:
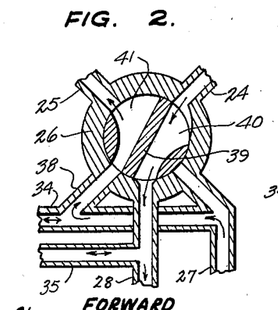
Figure 2 is a transverse cross-section of the direction-control valve of the transmission, as illustrated in Figure 1, showing the valve in position corresponding to forward speed of the vehicle, in which the transmission is installed.

When the direction-control valve 39 is in the operative position illustrated in Figure 2 the conduit 24 is connected through the valve passage 40 to the conduit 28, and the conduit 25 is connected through the valve passage 41, and the branch conduits 38 and 34 to the pump outlet conduit 27. This responds to the condition of the transmission for forward movement of the vehicle, hydraulic fluid at a controlled rate being supplied from the pump 10 to the fluid motor 12, and the power surges of the pump being absorbed and leveled out by the surge tank 37.

Figures 3, 4:
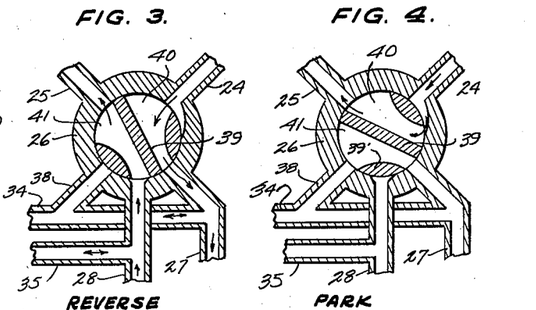
Figure 3 is a view similar to Figure 2, but showing the valve in position corresponding to reverse movement of the vehicle.
Figure 4 is a view similar to Figures 2 and 3, but showing the valve in the operative condition corresponding to standing or parking of the vehicle, with flow of fluid to the fluid motor blocked and the pump by-passed upon itself.
Figure 5:
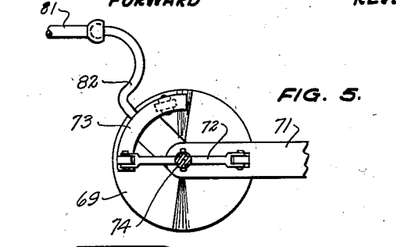
Figure 5 is a front elevation, partly in section on the line 5—5, of the control cam illustrated in Figure 1, and associated control mechanism.
Figure 6:
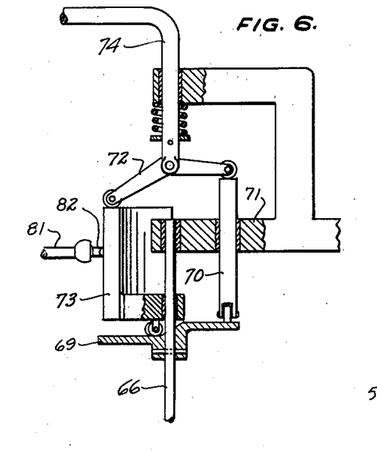
Figure 6 is a longitudinal, medial cross-section of the cam-and-control assembly illustrated in Figure 5.

When the direction-control valve 39 is in the position illustrated in Figure 3, the pump is connected to the motor for reverse operation of the vehicle. In this position of the valve, the pump outlet conduit 24 is connected with the motor conduit 27 through the passage 40, and the motor conduit 28 is connected to the pump inlet conduit 25 through the valve passage 41. In this case the surge tank 36 absorbs the power impulses of the pump and smooths out such impulses as they are applied to the fluid motor.

In Figure 4 the position of the direction-control valve 39 corresponds to the parking condition of the vehicle. In this position of the valve the pump outlet conduit 24 is directly connected to the pump inlet conduit 25 through the valve passage 40, but the motor conduit 28 is blocked by a portion 39' of the valve plug, so that the fluid motor cannot freely rotate. This will tend to hold the vehicle against movement in either direction, whereas, with the valve in the position illustrated in Figure 1, the vehicle may be rolled or towed, or the pump and motor may both be rotated at a restricted speed.

A cylindrical valve plug 43 is rotatably mounted in the cylindrical chamber or receptacle 21, and constitutes the pump-control valve. This valve plug is provided with two quadrant passages 44 and 45, and when the plug is in the position illustrated in Figure 1, the passage 44 connects the channel 18 with the conduit 24, while the passage 45 connects the channel 19 with the conduit 25, providing for full delivery of the pump output to the fluid motor 12. In the operative position of the valve plug 43 illustrated in Figure 14, the channel 18 is connected to the channel 19 through the passage 45, and in the position illustrated in Figure 15, the channel 18 is connected to the channel 19 through the passage 44, so that in both of the operative positions illustrated in Figures 14 and 15 the pump is completely by-passed, delivering no fluid to the motor 12. The valve plug 43 thus has two extreme positions in which it by-passes the pump, and a single, intermediate position in which it connects the pump with the motor. The portion of each pump cycle during which the pump is connected to the motor depends upon the proportionate time the valve plug 43 is in the position illustrated in Figure 1, and this is determined by the automatic control means presently to be described. Assuming the pump 10 and the motor 12 to have the same volumetric capacity, the speed ratio between the pump and the motor will, of course, be the same as the proportion of the total output of the pump to the portion of such total output delivered to the motor.

For example, if the control valve 43 connects the pump to the motor during exactly one-half of each operating cycle of the pump, the motor will be driven at a speed one-half the speed of the pump, and the speed ratio will be 1-to-2. If the control valve 43 remains, at all times, in the position illustrated in Figure 1, the entire output of the pump will be delivered to the motor, and the speed ratio will be 1-to-1.

A worm 46 is mounted on the end of the motor shaft 13 journaled in the bearing 32, and a governor drive shaft 47 is journaled in a bearing 48 carried by the brace 31, and has secured thereon a worm gear 49 which meshes with the worm 46, so that the shaft 47 is driven at a speed proportional to the speed of the motor shaft 13. A centrifugal governor 50 is mounted on shaft 47 and operates against a compression spring 51, and a plunger 52. A bell crank 53 is pivotally mounted to the outer side of the transmission frame 54 by pivotal connection 55, and is so positioned that the distal end of its shorter arm 56 bears on the outer end of governor plunger 52. The outer end of the longer arm 57 of the bell crank is pivotally connected to one end of a link 58, the opposite end of which is pivotally connected to the adjacent end of a rectangular slide 59.

The frame 54 has an elongated, outward extension 60 in which is provided an elongated guideway 61 having under-cut side edges which slidably receive the beveled edges of the rectangular slide 59. The guideway 61 is provided in its bottom surface with a groove somewhat in the shape of a figure seven, having a straight, transverse portion 62, and a diagonal portion 63 extending inwardly from the outer end of the transverse portion 62, and the slide 59 is provided with a slot having substantially the same shape as the groove in the guideway, such slot having a transverse portion 64 and a diagonal portion 65 extending inwardly from the outer end of the transverse portion and in a direction toward the governor 50.

A cam shaft 66 is journaled in suitable bearings provided in the valve housing 20, and provided intermediate its length with a worm gear 67. A worm 68 mounted on the pump shaft 11 near the end thereof journaled in the valve housing 20, meshes with the worm gear 67 to drive the cam shaft 66 at a speed proptional to the rotational speed of the pump shaft 11. A disc cam 69 having two diametrically-opposed, quadrant lobes and two diametrically-opposed quadrant dwells, is mounted on the end of the cam shaft 66 adjacent the transmission frame 54 to rotate about an axis substantially perpendicular to the axis of rotation of the pump shaft 11. A cam follower 70 is slidably mounted in a boss in a portion 71 of the transmission frame, and has one end in contact with the outer surface of the cam disc 69. A rock bar 72 has one end in contact with the end of the cam follower 70 opposite the cam disc, and has its opposite end in contact with the outer end of a cam following fulcrum 73 which bears at its inner end against the outer surface of cam disc 69, and is movable about the rotational axis of the cam disc.

The fulcrum 73 is movable about the rotational axis of the disc through an angle of approximately 90-degrees, and has at one side a quadrant extension, so that it always underlies the corresponding end of the rock bar 72. When the fulcrum 73 is positioned substantially at 90-degrees to the cam follower 70, the cam follower will rise on a cam lobe at the same time the fulcrum drops on a cam dwell, so that the ends of the rock bar 72 will move up-and-down in opposite directions and substantially no movement will be imparted to the mid-length portion of the rock bar. When the fulcrum 73 is disposed substantially diametrically opposite the cam follower, the cam follower and the fulcrum will be moved together as the cam lobes and dwells pass them, and the maximum amount of movement will be imparted to the mid-length portion of the rock bar. At positions between 180-degrees apart and 90-degrees apart the cam follower and the fulcrum will impart varying degrees of movement to the mid-length portion of the rock bar as the cam dwells and lobes pass thereby. A link 74 connects the mid-length portion of the rock bar 72 to the outer end of an arm 75 which projects radially outwardly from the control-valve plug 43, so that this valve plug is oscillated in the receptacle 21 in response to movements of the mid-length portion of the rock bar 72 as imparted to the rock bar by the cam disc 69. If no movement is imparted to the mid-length portion of the rock bar, the valve plug 43 will remain substantially in the position illustrated in Figure 1, connecting the pump to the motor in a substantially 1-to-1 speed ratio. When the maximum amount of movement is imparted to the mid-length portion of the rock bar, the valve plug 43 will be rapidly oscillated between the positions shown in Figures 14 and 15, so that the pump will be substantially by-passed and little or no fluid will be supplied to the motor 12. At intermediate positions of the rock bar fulcrum 73, the valve 43 will be operated to connect the pump to the motor during a proportionate part of each pump cycle, thereby providing a variable speed ratio drive between the pump 10 and the motor 12. While the cam disc 69 is driven by the pump shaft 11, the operation of the valve is controlled not by the speed of the pump, but by the position of the fulcrum 73.

A pivot pin 76 is slidable in the groove portions 62 and 63 of the guideway, and projects through the slot portions 64 and 65 of the slot in the slide 59. A lever 77 rests upon the slide and is provided with an elongated slot 78 through which the pin 76 extends. The frame 54 is provided with an elongated guide groove 79 extending substantially parallel to the guideway 61, and an extension on the lever 77 carries a pin or roller 80 which is movable in the guide groove 79 to restrain the lever 70 against longitudinal movement transversely of the slide 59 and guideway 61. With this construction the lever 70 is moved longitudinally of the guideway 61 when the slide 59 is moved longitudinally of the guideway by the governor 50.

A link 81 is connected at one end to the inner end of lever 77, and at its opposite end to an arm 82 projecting outwardly from the rock bar fulcrum 73, so that the rock bar fulcrum is moved about the axis of rotation of the cam disc 69 by operation of the governor 50.

A link 83 is pivotally connected at one end to the end of lever 77 opposite the end of the lever to which the link 81 is connected, and the link 83 passes, at its opposite end, through a fork provided on the outer end of one leg of a bell crank 84 pivotally mounted at its knee on a fixed support 85. As diagrammatically illustrated, the support 85 depends from the floor boards 86 of the vehicle, and an accelerator pedal 87 is pivotally mounted at one end on the floor boards 86. An accelerator rod 88 extends from the free end of the accelerator pedal 87 through an aperture in the floor boards and is connected at its opposite end to an arm 89 which operates the butterfly valve 90 in the Venturi section 91 of the vehicle engine carburetor. The accelerator rod 88 passes through a fork on the outer end of the other leg of the bell crank lever 84, and suitable stop nuts 92 are threaded on the accelerator rod, so that the bell crank lever will be turned about its pivotal connection when the accelerator is depressed. A nut 93 threaded onto link 83 bears against the fork of the bell crank lever through which the link 83 passes, so that the link 83 will be pulled in the right-hand direction, as diagrammatically illustrated in Figure 1, when the accelerator pedal 87 is depressed. A stop 94 on link 83 limits pivotal movement of the lever 77 relative to the link 83, so that the lever cannot make an angle less than 90-degrees with the link.

It is to be understood that the apparatus illustrated in Figure 1 is shown diagrammatically, and in a highly simplified condition, and that various changes may be made and various components, such as necessary links and levers, added in the actual application of the transmission and control mechanism to a vehicle. It is also to be understood that while the pump 10 and fluid motor 12 have been mentioned as having the same volumetric capacity, the pump may have a greater or a less volumetric capacity than the motor 12, depending upon the conditions under which the transmission is intended to operate. When the transmission is applied to an automotive vehicle the relative volumetric capacity of the pump and the motor, and the operation of the pump-control valve 43 is so arranged that with the maximum possible speed reduction from the pump to the motor, the power of the engine will not be sufficient to spin the driving wheels of the vehicle under ordinary dry-road conditions.

Figure 13:
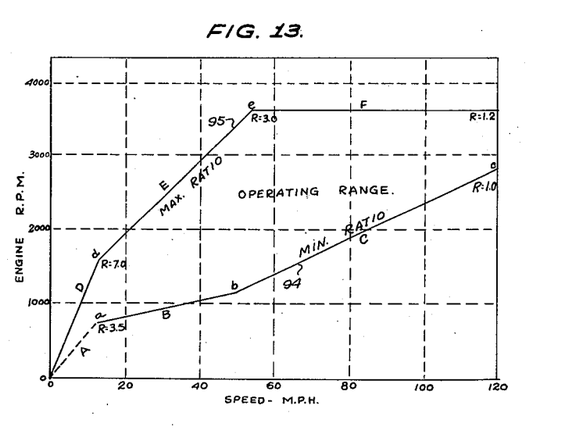
Figure 13 is a graph illustrating the operation of the transmission under two different, selected conditions in terms of vehicle speed and miles-per-hour and engine speed in revolutions-per-minute.

Referring to Figure 13, the graph there illustrated has vehicle speed in miles-per-hour as abscissa, and engine speed in revolutions-per-minute as ordinates. It is well known that the power speed curve of a conventional internal combustion engine reaches a maximum horsepower peak at a definite engine speed, and after this engine speed has been passed, the horsepower tends to drop off because of increasing friction, decreasing volumetric efficiency of the engine, and other factors. In the graph shown in Figure 13 the maximum horsepower speed of the engine is represented by the line $f$ and has been assumed to occur at approximately 3600-revolutions-per-minute of the engine crank shaft.

The graph shows two curves, as indicated at 94 and 95, each of which extends from a vehicle speed of zero, that is, from a start of the vehicle from a dead stop, to a maximum vehicle speed of 120-miles per hour. The curves 94 and 95 have been somewhat arbitrarily selected to represent operation at maximum engine economy and operation at maximum engine power respectively. The slopes of these curves for an actual installation would depend upon the power-and-speed curve of the engine, the engine manifold pressure and torque output relationship at various speeds, the total inertia of the vehicle, the differential reduction gear ratio, and other factors.

Assuming first, that the vehicle is accelerated along the maximum economy or minimum ratio curve 94, with the engine in idling operation, the direction-control valve 41 will be manually moved from its parking position, as illustrated in Figure 4, to its forward-speed position, as illustrated in Figure 2, whereupon the pump 10 will start to supply hydraulic fluid under pressure to the motor line 28. If there is little or no pressure in the surge tank 37, a large portion of the fluid supplied to the motor line 28 will be pumped through the line 35 into the surge tank 37 to build up the pressure in this tank. The governor 50 being, at this time, fully contracted, the rock bar fulcrum 73 will be at a position substantially diametrically opposite the cam follower 70 imparting to the mid-length portion of the rock bar 72 the maximum movement, so that the control valve 43 is rapidly oscillated between its two by-pass positions, as illustrated in Figures 14 and 15, thereby, by-passing the major portion of each pump cycle and delivering only a small quantity of hydraulic fluid to the motor line. This represents the condition of maximum speed reduction between the pump 10 and the motor 12, and, as explained above, is so proportioned that the torque exerted by the motor is not sufficient to spin the driving wheels of the vehicle under dry-road conditions.

As soon as the pressure in surge tank 37 has built up sufficiently, enough pressure will be applied to the motor 12 to start rotating the motor and driving the vehicle.

The idling speed of the vehicle engine is such that under these conditions, the engine, at idling speed, will bring the vehicle up to a slow forward speed, for example, 10-miles per hour, as represented by the dotted portion $a$ of the curve 94.

At the above, predetermined low speed, the governor 50 starts to expand and to move the slide 59 in a direction away from the governor. This movement of the slide 59 carries the lever 77 in the same direction, and the link 81 connecting the lever 77 to the rock bar fulcrum 73 moves the rock bar fulcrum away from its original position substantially diametrically opposite the cam follower 70. This changes the operation of the control valve 43, so that a slightly greater portion of the pump output is delivered to the motor, and this movement of the rock bar fulcrum 73 by the governor 50 will continue until the torque output of the motor shaft becomes as great as the torque output of the vehicle engine at idling speed, whereupon the engine and pump will start to slow down, slowing down the motor and the governor, and thus returning the fulcrum 73 toward its original position to increase the speed-reduction ratio between the pump and the motor. The vehicle speed at which this occurs will depend on road and wind conditions, but on a level road, without excessive wind, may occur at around 15-miles-per-hour as represented by the point $a$ on curve 94, and at a speed-reducing ratio between the pump and the motor of approximately 3½-to-1, that is, the pump will make 3½ revolutions for each revolution of the fluid motor 12. If the vehicle speed is to be increased, it now becomes necessary to begin to open the engine throttle to increase the power output of the vehicle engine.

With the increase in engine power output occasioned by opening the engine throttle, the rotational speed of the pump and the fluid motor will increase, and the governor 50 will again expand and move the rock bar fulcrum 73 away from the cam follower 70, thereby slowing down the operation of the pump-control valve 43 and causing an increasingly greater amount of the pump output fluid to be delivered to the fluid motor.

Figure 7:
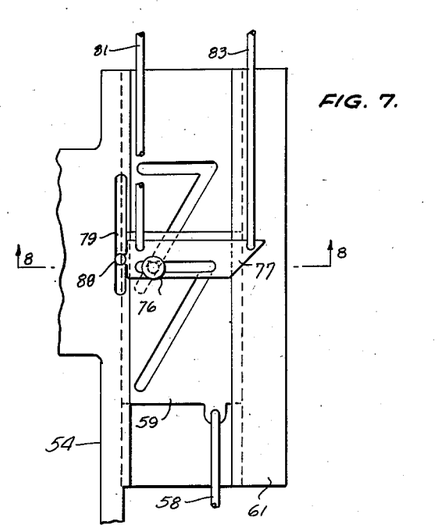
Figure 7 is a top plan view on an enlarged scale of the guideway, slide and lever, illustrated in Figure 1, and constituting an operative component of the control mechanism.
Figure 8:
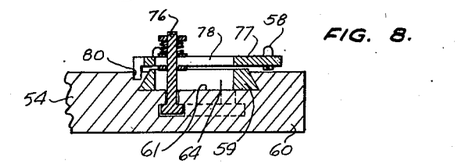
Figure 8 is a transverse cross-section on the line 8—8 of Figure 7.

As the governor 50 expands, the slide 59 is moved in a direction away from the governor, moving the pivot pin 76 and the lever 77 in the same direction, so that the link 81 is effective to move the fulcrum 73. At the same time, the pivot pin 76 is moved in a direction away from the transmission frame 54, or outwardly, in the transverse slot portions 64 and 78 of the lever and the slide, as illustrated in Figure 7.

Under these conditions, the speed of the vehicle will increase to some value, such as 50-miles-per-hour, as represented by point $b$ on curve 94, at which vehicle speed the torque output of the fluid motor 12 will again equal the torque of the engine, and no further increase in speed will be obtained.

This may occur at a speed-reduction ratio between the pump 10 and the motor 12 of approximately 2-to-1.

In order to obtain a further increase in vehicle speed, it is now necessary to further increase the engine power by increasing the throttle opening, whereupon the speed of the pump 10 and the fluid motor 12 will again be increased, further expanding the governor, until the slide 59 is moved sufficiently to bring the pivot pin 76 to the outer ends of the transverse slots 64 and 78 in the slide, and lever 77 respectively. At this time the transverse slots 64 and 78 will be in alignment with the transverse portion 62 of the groove in the guideway 61, and the rock bar fulcrum 73 will have been moved to a position at which it is substantially 90 degrees from the cam follower 70, imparting little or no movement to the mid-length portion of the rock bar 72. The control valve 43 will then be stopped in the position illustrated in Figure 1 in which the pump 10 is connected to the fluid motor 12 substantially throughout each operating cycle of the pump, and the speed ratio between the pump and the motor is substantially 1-to-1. This will occur somewhere along the portion c of curve 94, and a further increase in vehicle speed, after the highest speed of the motor relative to the speed of the pump has been obtained, is then accomplished by the further opening of the engine throttle and thus increasing the engine speed and power.

It will be noted that as the lever 77 is advanced by the governor 50, the link 83 is also advanced, moving the stop nut 93 away from the corresponding fork of the bell crank 84. On the maximum economy range, indicated by the curve 94, the accelerator pedal 87 is depressed so that the bell crank lever fork follows, but does not exert any pressure on the nut 93, and the lever 77 is not turned about the pivot pin 76, at any time, and the advance of the fulcrum 73 from its original position substantially diametrically opposite the cam follower 70 to its final position in which it is disposed at substantially 90-degrees angularity to the cam follower is not, at any time, retarded. Under these operating conditions the vehicle may be brought to its maximum speed of 120-miles-per-hour at an engine speed of less than 3000-revolutions-per-minute, maintaining, at all times, a maximum motor speed relative to the speed of the fluid pump which keeps the engine operating at a slower speed and higher manifold pressure, which is consistent with maximum economy of engine operation.

The curve 95 represents an operating condition of maximum engine power, that is, a condition under which the engine throttle is fully opened at the start of the vehicle and maintained fully opened until the maximum vehicle speed is reached.

Figure 9:
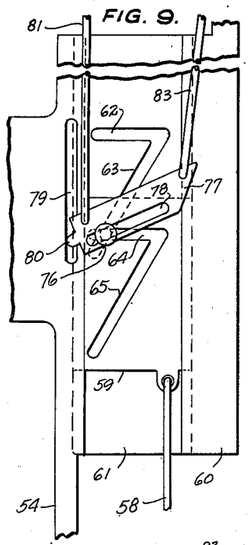
Figures 9, 10, 11 and 12 are views similar to Figure 7, but showing the slide and lever in different operative positions relative to the supporting guideway.

With the throttle fully opened from the start, the first part of curve 95 from zero to point d differs from the first part of curve 94 from zero to point a, in that the curve part d has a much steeper slope. This is occasioned by the action of link 83 on lever 77. As the slide 59 is advanced by the governor, the pull of the accelerator pedal 87 on the link 83 through the bell crank lever 84 turns the lever 77 about the pivot pin 76, so that the advancing movement imparted to the slide by the governor is not effective to move the rock bar fulcrum 73, thus keeping the transmission in its original low-speed ratio for an appreciable time, and allowing the speed of the engine to rapidly increase. At the beginning of the operation the leverage exerted by lever 77 on link 81 is very small, as illustrated in Figure 7, because the pivot pin 76 is near the inner ends of the slots 64 and 78. The condition corresponding to the condition shown in Figure 7, but with the throttle fully opened, is illustrated in Figure 9.

As the speed of the vehicle increases, and the slide 59 is advanced by the governor 50, the pivot pin 76 is moved along the diagonal portion 63 of the groove in the guideway 61, and is simultaneously moved lengthwise of the transverse slots 64 and 78. When the accelerator pedal is fully depressed at the start of the vehicle, the fulcrum 73 is moved somewhat closer to the cam follower 70 than in the condition corresponding to idling operation of the engine, thus providing a greater speed reduction between the pump 10 and the fluid motor 12. As the slide 59 is advanced by expansion of the governor 50, the pivot pin 76 moving in the diagonal portion 63 of the groove in the guideway, moves toward that end of link 83 connected to the lever 77, thereby decreasing the leverage acting on the fulcrum-moving link 81, and simultaneously moving this link 81 in a direction to reduce the speed differential between the pump and the motor.

Figures 10, 11:
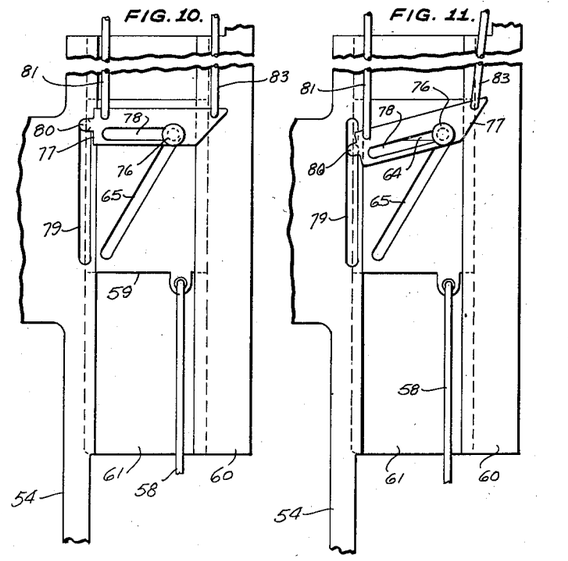
Figure 12:
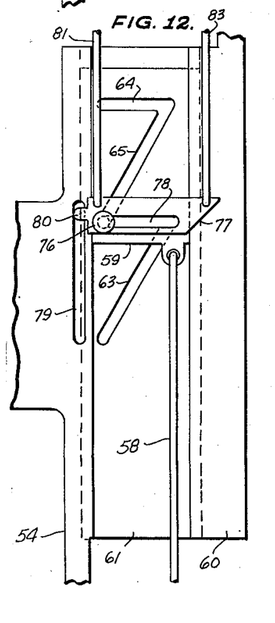

The speed of the vehicle will thus increase with a decreasing speed differential between the pump and the motor until the pivot pin 76 is brought to the end of the diagonal portion 63 of the slideway groove which is connected to the adjacent end of the transverse portion 62 of this groove, as illustrated in Figure 11. Under these conditions the speed ratio between the pump and the motor has not been brought to a minimum speed differential or to a 1-to-1 drive, because the lever 77 is still held in position by the link 83 to maintain a speed differential between the pump and the motor greater than would be maintained if the accelerator pedal were not fully depressed.

The condition illustrated in Figure 11 corresponds to the point e on curve 95 at which the engine has been brought up to the speed corresponding to its maximum horsepower. With the throttle still fully depressed, the vehicle will continue to accelerate, and the governor 50 will continue to expand further advancing the slide 59. As the slide 59 advances beyond the position illustrated in Figure 11, the pivot pin 76 travels in the diagonal portion 65 of the slide slot and the pivot pin is thus gradually returned to a position adjacent the lever-connected end of the link 81, thus decreasing the leverage by which the link 83 acts on the rock bar fulcrum 73. This movement of the pivot pin from the end of the lever slot 78 adjacent the link 83 to the end of such slot adjacent the lever 81, advances the link 81 and further increases the separation of the fulcrum 73 from the cam follower 70, but does not bring the fulcrum to a position diametrically opposite the cam follower, so that the speed differential between the pump 10 and the fluid motor 12 never reaches its minimum value under the conditions indicated by the curve 95. The operating conditions represented by curve 95 will, however, bring the vehicle up to its maximum speed in a much shorter operating period than will the operating conditions represented by the curve 94.

It will be noted that as long as the lever 77 is being advanced with the slide by the governor, the link 83 is being advanced relative to the associated fork of the bell crank 84, so that the effect of depression of the accelerator pedal 87 on the link 83 is decreased, that is, the pedal 87 will have to be depressed further before the associated fork engages the stop nut 93 on link 83, thus the retarding effect on speed ratio reduction by full depression of the accelerator pedal becomes somewhat less as the speed of the vehicle increases.

Normal operation of the vehicle will occur somewhere between curves 94 and 95 in Figure 13, but in any position of the accelerator pedal 87 materially short of full depression of the pedal, full depression of the pedal will cause an immediate increase in the speed differential between the pump 10 and the fluid motor 12, thus giving to the transmission the necessary downward shift for quick acceleration, in case the accelerator pedal is fully depressed for passing or for maintaining or gaining speed on a steep grade.

The improved hydraulic transmission thus operates to provide a gradually decreasing speed differential between the driving and driven components of the transmission with increasing vehicle speed, provides for automatic increase in this speed differential if the resistance to forward movement of the vehicle exceeds the power of the engine at the particular throttle setting, and automatically decreases this speed differential as the power of the engine is manually increased by operation of the engine accelerator, and provides for an immediate increase in the speed differential between the driving and driven components of the transmission whenever the accelerator pedal is fully depressed to obtain maximum acceleration of the vehicle. It also limits engine operating speed to the speed consistent with maximum engine power output, and limits the torque applied to the driving wheels to a value which will not cause the wheels to slip under normal driving conditions.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fluid-operated transmission comprising a positive displacement engine-driven pump, a positive displacement fluid motor, respective fluid conduits connecting the opposite sides of said pump with the opposite sides of said motor, a manually operated direction control valve disposed between said fluid conduits and hydraulically connected therewith, said direction control valve having four operating positions in which it respectively connects said pump to said motor for forward rotation of the motor, connects said pump to said motor for reverse rotation of the motor, blocks the two sides of the motor while connecting the two sides of said pump and connects the two sides of the motor and also connects the two sides of the pump, surge tanks hydraulically connected one to each fluid conduit between said direction control valve and said motor, a pump control valve disposed between said pump and said direction control valve in said fluid conduits and hydraulically connected thereto, said pump control valve having an operating cycle in one portion of which the valve interconnects the two sides of the pump to by-pass the pump and simultaneously blocks said motor and surge tanks from the pump and in another portion of which cycle the valve connects the opposite sides of the pump with the respective sides of the motor to render the pump effective to drive the motor during a variable portion of the pump-operating cycle, a speed governor driven by said motor, a multi-lobe cam disc driven by said pump, a cam follower engaging said cam disc at one side of the latter, a rock bar connected at one end to said cam follower, a rock bar fulcrum engaging said cam disc at the opposite end of said rock bar and movable about the axis of rotation of said cam disc to render said cam disc effective to impart varying degrees of cyclic movement to the mid-length portion of said rock bar, a link connecting the mid-length portion of said rock bar to said pump control valve, an elongated, fixed guideway having a transverse groove and a diagonal groove therein extending from one end of said transverse groove, a slide movable in said guideway and having therein a transverse slot and a diagonal slot extending from one end of said transverse slot, a link and a motion-multiplying lever connecting said slide to said governor, a pivot pin slidable in the grooves in said guideway and extending through the slots in said slide, a lever disposed on said slide and having therein an elongated slot receiving said pivot pin, a link connecting one end of said lever to said rock bar fulcrum, and a link connecting the opposite end of said lever to the throttle control of a pump-driving engine, said governor being effective to change the speed ratio of said transmission toward a higher motor speed relative to pump speed upon increase in motor speed and said lever being effective to reduce the speed of the motor relative to the pump when the engine throttle is opened beyond a predetermined extent.

2. In a hydraulic transmission including a driving component, a driven component, conduits inter-connecting said driving and driven components, and a manually operated direction control valve interconnected in said conduits between said driving and driven components, surge tanks hydraulically connected one to each conduit between said direction control valve and said driven component, a pump control valve hydraulically connected to said conduits adjacent said driving component and having an operating cycle in one portion of which it by-passes said driving component and in another portion of which it drivingly connects said driving component to said driven component, impulse generating means driven by said driving component and connected to said pump control valve for imparting cyclic operation to the latter, a governor driven by said driven component, and means connecting said governor to said impulse generating means to modify the generated impulses and thereby vary the operating cycle of said pump control valve in response to variations in the speed of said driven component.

3. In a hydraulic vehicle transmission including an engine operated driving component, a vehicle propelling driven coponent, conduit means inter-connecting said driving and driven components, and a manually operated direction control valve connected into said conduit means between said driving and driven components, surge tanks hydraulically connected to said conduit means between said driven component and said manually operated direction control valve, control means connected into said conduit means between said driving component and said direction control valve and cyclically operated to successively by-pass said driving component while simultaneously blocking said driven component from said driving component and to connect said driving component with said driven component during variable portions of each operating cycle of said driving component, means drivingly connecting said driving component to said control means to impart cyclic movement to the latter, means responsive to the speed of said driven component connected to said means imparting said cyclic movement to said control means to vary the cyclic movements of said control means and thereby vary the portions of each operating cycle of said driving component during which the latter is by-passed and connected to said driven component, and manually operated means connected to said speed-responsive means to vary the controlling action of the latter on said means imparting cyclic movement to said control means.

4. In a hydraulic transmission including a pump, a hydraulic motor, and conduits extending between the opposite sides of said pump and the corresponding opposite sides of said motor, a control valve connected between said conduits and cyclically operable to successively inter-connect the two sides of said pump while blocking said motor from said pump and connect the opposite sides of said pump with the corresponding sides of said motor during each operating cycle of said pump, means driven by said pump imparting cyclic movement to said control valve in timed relationship to the cyclic operation of said pump, and means responsive to the speed of said motor controlling the operation of said means imparting cyclic movement to said control valve to increase the interval of each pump cycle during which the opposite sides of said pump are connected to the corresponding sides of said motor in response to increasing speed of said motor, and a respective surge tank hydraulically connected to each opposite side of said motor.

5. In a hydraulic transmission including a pump, a hydraulic motor, and conduits extending between the opposite sides of said pump and the corresponding opposite sides of said motor, a control valve connected between said conduits and cyclically operable to successively inter-connect the two sides of said pump while blocking said motor from said pump and connect the opposite sides of said pump with the corresponding sides of said motor during each operating cycle of said pump, means driven by said pump imparting cyclic movement to said control valve in timed relationship to the cyclic operation of said pump, and means responsive to the speed of said motor controlling the operation of said means imparting cyclic movement to said control valve to increase the interval of each pump cycle during which the opposite sides of said pump are connected to the corresponding sides of said motor in response to increasing speed of said motor, and a respective surge tank hydraulically connected to each opposite side of said motor, and manual-control means operatively connected to said speed-responsive means to retard the effect of said speed-responsive means in increasing the interval of each pump cycle during which the opposite sides of the pump are connected to the corresponding sides of the motor in response to increasing speed of the motor.

6. In a hydraulic transmission including a pump, a hydraulic motor, and conduits extending between the opposite sides of said pump and the corresponding opposite sides of said motor, a control valve connected between said conduits and cyclically operable to successively inter-connect the two sides of said pump while blocking said motor from said pump and connect the opposite sides of said pump with the corresponding sides of said motor during each operating cycle of said pump, means driven by said pump imparting cyclic movement to said control valve in timed relationship to the cyclic operation of said pump, and means responsive to the speed of said motor controlling the operation of said means imparting cyclic movement to said control valve to increase the interval of each pump cycle during which the opposite sides of said pump are connected to the corresponding sides of said motor in response to increasing speed of said motor, and a respective surge tank hydraulically connected to each opposite side of said motor, said means imparting cyclic movement to said control valve comprising a cam disc driven by said pump, a rock shaft adjacent said cam disc, a cam follower interposed between one end of said rock shaft and said cam disc, a movable rock shaft fulcrum interposed between the opposite end of said rock shaft and said cam disc, and means connecting said mid-length portion of said rock shaft to said control valve, said speed-responsive means being connected to said rock shaft fulcrum to move the latter in response to variations in the speed of said motor.

7. In a hydraulic transmission including a pump, a hydraulic motor, and conduits extending between the opposite sides of said pump and the corresponding opposite sides of said motor, a control valve connected between said conduits and cyclically operable to successively inter-connect the two sides of said pump while blocking said motor from said pump and connect the opposite sides of said pump with the corresponding sides of said motor during each operating cycle of said pump, means driven by said pump imparting cyclic movement to said control valve in timed relationship to the cyclic operation of said pump, and means responsive to the speed of said motor controlling the operation of said means imparting cyclic movement to said control valve to increase the interval of each pump cycle during which the opposite sides of said pump are connected to the corresponding sides of said motor in response to increasing speed of said motor, and a respective surge tank hydraulically connected to each opposite side of said motor, said speed-responsive means comprising a speed-responsive governor driven by said motor, and means connecting said governor to said pump-driven means imparting cyclic movement to said control valve comprising a lever connected at one end to said last-mentioned means, manually-operated means connected to the opposite end of said lever, a pivot pin engaging said lever intermediate the length of the latter, means interconnecting said governor and said pivot pin to move said lever in a direction to vary the operation of said means imparting cyclic operation to said control valve, and to move said pivot pin in a direction to vary the leverage exerted by said manually-operated means on said means imparting cyclic movement to said control valve in response to variations in the speed of said motor.

LOWELL SISSON.

(References on following page)

REFERENCES CITED

The following references are of record in the file of this patent:

UNITED STATES PATENTS

| Number | Name | Date |
|---|---|---|
| 743,484 | Gerdes | Nov. 10, 1903 |
| 1,754,181 | Saccaggio | Apr. 8, 1930 |
| 2,363,389 | Brice | Nov. 21, 1944 |
| 2,379,938 | Swanson | July 10, 1945 |
| 2,394,160 | Emmitt | Feb. 5, 1946 |
| 2,500,580 | Segsworth | Mar. 14, 1950 |